April 7, 1959

G. F. W. POWELL 2,881,275

DEVICE FOR DETECTING WORKPIECES SUCH AS CARD
BLANKS FOR PACKETS

Filed Dec. 10, 1956

3 Sheets-Sheet 1

INVENTOR
GORDON F.W. POWELL
BY
Watson, Cole, Grindle & Watson
ATTORNEYS

April 7, 1959  G. F. W. POWELL  2,881,275
DEVICE FOR DETECTING WORKPIECES SUCH AS CARD
BLANKS FOR PACKETS
Filed Dec. 10, 1956  3 Sheets-Sheet 2

INVENTOR
GORDON F.W. POWELL
BY
Watson, Cole, Grindle & Watson
ATTORNEYS

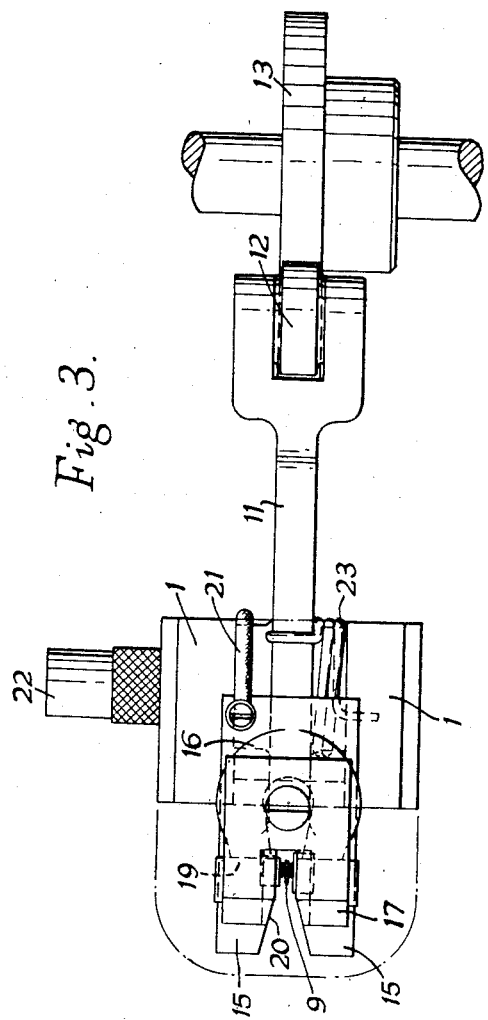

United States Patent Office 2,881,275
Patented Apr. 7, 1959

2,881,275

DEVICE FOR DETECTING WORKPIECES SUCH AS CARD BLANKS FOR PACKETS

Gordon Francis Wellington Powell, London, England, assignor to Molins Machine Company Limited, London, England, a British company Application December 10, 1956, Serial No. 627,450

Claims priority, application Great Britain December 16, 1955

2 Claims. (Cl. 200—61.41)

This invention concerns a device for detecting workpieces, for example workpieces such as card blanks for packets, movable in succession along a path, in an automatic packing machine.

According to the invention there is provided a device for detecting workpieces (e.g. movable in succession along a path) comprising a feeler urged towards a workpiece position, a strip of magnetic material attached to the feeler and having a free end arranged to occupy a neutral zone between two magnetic poles when a correct workpiece lies beneath the feeler or to be biased towards one side or the other of said zone if a workpiece is undersize, oversize, or missing from the detecting position whereby when said strip is thus biased it will be pulled to the nearer magnet pole and by making contact therewith complete a circuit. For example, contact may complete a relay circuit, which can be used to stop a machine comprising said detector or operate an alarm or a recorder or for any other purpose to which such detectors are applied.

Where, as is usually the case, the workpieces move in uniform spaced relationship, the magnet may be arranged to move in timed relationship with the workpieces so as to occupy an operative position with respect to the strip when a workpiece should be at the detecting position and out of said operative position during the intervals between the arrival of workpieces at said position, and for this purpose the magnet may be fixed to a movable support and operated by a cam driven in timed relationship with the workpiece movements.

Figure 1:
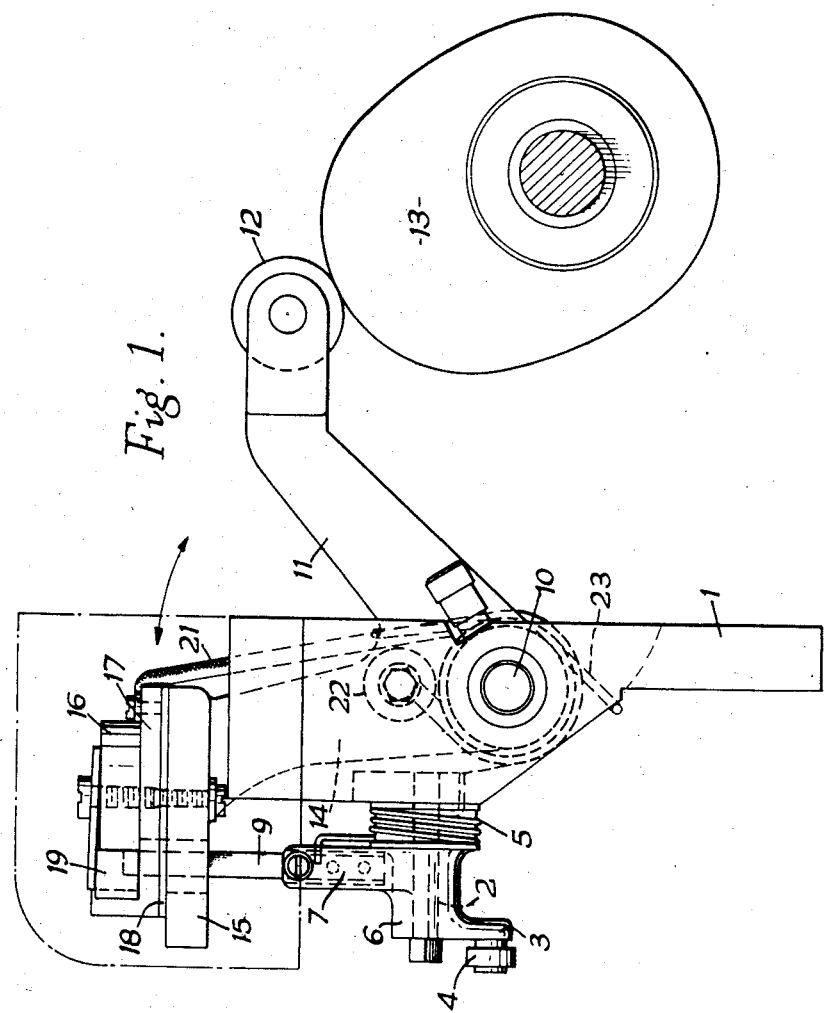
Figure 2:
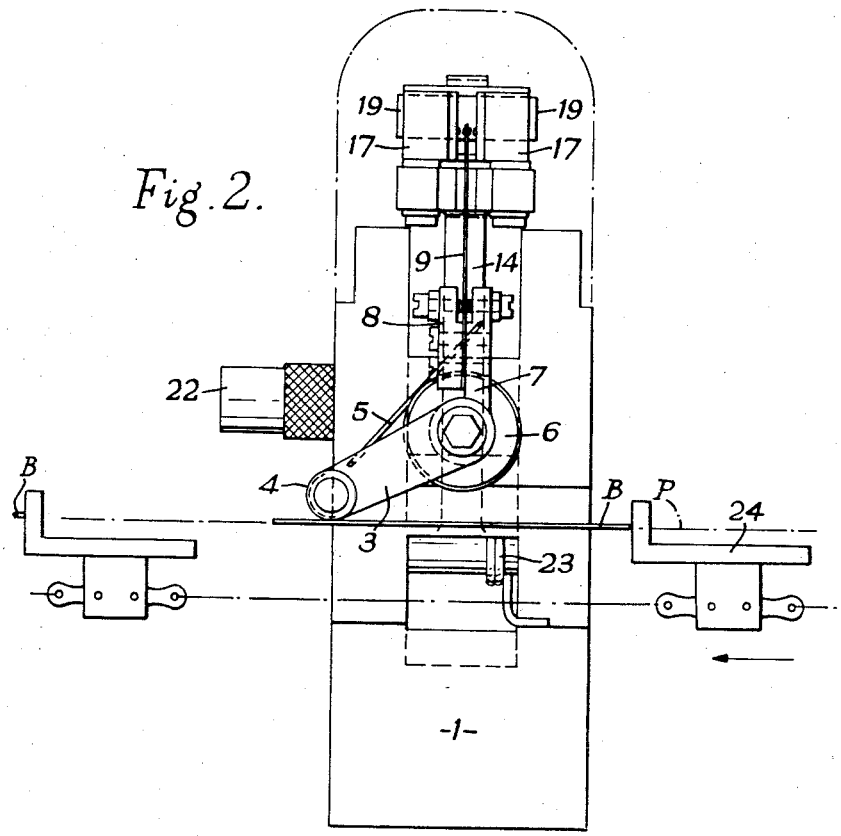

The invention will be more fully described with reference to the accompanying drawing in which:

Figure 1 is a side elevation of the device.
Figure 2 is a front elevation of Figure 1.
Figure 3 is a plan of Figure 1.

Referring to the drawings, 1 is a bracket which is fitted to an automatic packing machine and to it is fixed a pivot pin 2. On the pivot is mounted the boss 6 of a bell crank lever made of non-magnetic material and having an arm 3 at the free end of which is a roller 4 constituting the feeler of the detector. A torsion spring 5 surrounds the boss 6 of the bell crank lever, the other arm 7 of the lever having a clamp 8 which holds a thin strip 9 of magnetic material. This strip may be made of mumetal. As seen in Figure 2 this strip is vertical and is then in the position it would occupy if a correct blank B were resting beneath the roller 4, this blank being one of a series moving in uniform spaced relationship along a path P. In practice the path P would be the surface of a machine bed and the blanks would be moved along the surface by a series of pushers 24 fitted on an endless conveyor. The torsion spring tends to urge the roller 4 downwards into contact with the path P.

A larger bell crank lever made of non-magnetic material is pivoted to the bracket 1 at 10 and has one arm 11 on which is a cam roller 12 engaging a cam 13. The other arm 14 of the lever has its upper part 15 shaped as a flat bracket which supports a horseshoe magnet 16. A torsion spring 23 surrounds the boss of the bell crank lever. The magnet rests on a brass angle piece 17 supported above the surface of the part 15 by a thin plate 18 of insulating material. The magnet is provided with pole pieces 19 chiefly to extend its length and provide parallel opposed surfaces, the magnet being a commercial article. Electrical contacts are formed on the pole pieces by hard silver plating. The flat bracket 15 extends beyond the end of the brass angle 17 and is forked at 20 with the opposed faces of the fork diverging as they extend away from the magnet.

Electrical contact is made to the brass angle 17 by a flexible conductor 21 the other end of which joins a contact pin in a cable socket 22. The outside of the socket is in electrical contact with the bracket 1 and one conductor of the cable is thereby grounded to the bracket.

The upper end of the strip 9 has contacts on its opposite faces formed by hard silver plating and if a contact moves into contact with the corresponding contact of a pole piece a circuit is completed from one of the cable conductors to said pole piece and through the strip 9 to ground, that is, to the bracket 1 and thus back to the other conductor of the cable. The distance from the axis of the roller 4 to the centre of boss 6 is half the distance between said centre and the contacts on strip 9 thus giving a 2:1 ratio of movement of said contacts.

The cam 13 rotates at the rate of one revolution for each blank that should pass the detector position and thus the magnet is rocked to and fro from the position shown in Figure 1, which is termed the operative position and in which it can pull the strip over to a pole, to an inoperative position to the right in Figure 1 and well away from the strip.

In operation the cam 13 is driven and the magnet rocks as described while blanks pass in succession along the path, the cam being so timed that each time a blank should be beneath the feeler the magnet is in the position shown in Figure 1.

If a blank is present, the strip 9 will be vertical as viewed in Figure 2 and nothing happens. This is because if the strip is properly adjusted by the adjusting screws shown in the clamp 8 and arm 7 it can occupy a position between the magnet poles such that the pull of each pole is equal, the strip then being said to occupy a neutral zone.

If a blank is not present the feeler will move down under pressure of the spring 5 and into contact with the path P. If two or more blanks arrive at once at the detector position the feeler will be lifted above the position shown in Figure 2. In either of these cases the strip will be moved out of the neutral zone and be pulled over to one or the other of the pole pieces, making contact as described above. Such contact can complete a circuit through a relay (not shown) and be used to stop the machine or in any other usual way. The diverging faces of the fork 20 are provided to avoid risk of breakage should an operator bias the strip 9 by lifting the feeler while the magnet is oscillating.

While card blanks have been considered as the workpieces and the detector has been used to detect the absence of a workpiece or the presence of more than one it will be seen that the device can easily be used to detect if a workpiece is unduly thick or unduly thin in the same way.

If desired the strip 9 may be replaced by a pair of strips, normally in contact with one another and with stops to limit the movement of each strip to a movement towards the neighbouring pole.

With a detector constructed as above described small differences in thickness of a workpiece give a large and positive movement of the contacts on the strip 9. If two strips are used as noted in the preceding paragraph detection to a tolerance of ±.001" is possible.

The wear on the electrical contacts is negligible when the device is used on an automatic machine since they are only in contact when there is a fault in the machine; a fairly rare occurrence.

Further the contact when made is firm and positive and a wiping action occurs while the contact faces are in engagement as the magnet moves in the vicinity of the strip 9, into and out of the operative position. Also the contacts engage and disengage with a snap action.

What I claim as my invention and desire to secure by Letters Patent is:

1. A device for detecting workpieces movable in succession and in regularly spaced relation along a predetermined path through a detector position, comprising a feeler urged toward the detector position, a strip of magnetic material attached to the feeler, a magnet having two magnetic poles, said strip occupying a neutral zone between said magnetic poles when a correct workpiece passes beneath the feeler and being displaced by said feeler toward one side or the other of said zone when a correct workpiece fails to pass, whereby when said strip is thus displaced it will be pulled to the nearer magnetic pole, an electrical circuit, contact means operable on biasing of said strip to complete said circuit, and means moving said magnet in timed relationship with the workpieces to cause the magnet to occupy (1) an operative position with respect to the strip when a workpiece should arrive at said detector position and (2) an inoperative position during the intervals between the arrival of workpieces at said detector position.

2. A device as claimed in claim 1 in which said contact means are mounted on said pole pieces and said strip and wherein said magnet is mounted for movement to inoperative position in a direction to wipe engaged contacts.

References Cited in the file of this patent
UNITED STATES PATENTS

| | | |
|---|---|---|
| 1,976,953 | Mantz | Oct. 16, 1934 |
| 1,976,954 | Mantz | Oct. 16, 1934 |
| 2,179,517 | Pelosi | Nov. 14, 1939 |
| 2,667,631 | Schaurte | Jan. 26, 1954 |
| 2,687,454 | Hall | Aug. 24, 1954 |
| 2,700,154 | Dilts | Jan. 18, 1955 |